Aug. 7, 1956 J. R. WEST 2,757,598
METERING DEVICE FOR GRANULAR MATERIAL
Filed Dec. 15, 1954
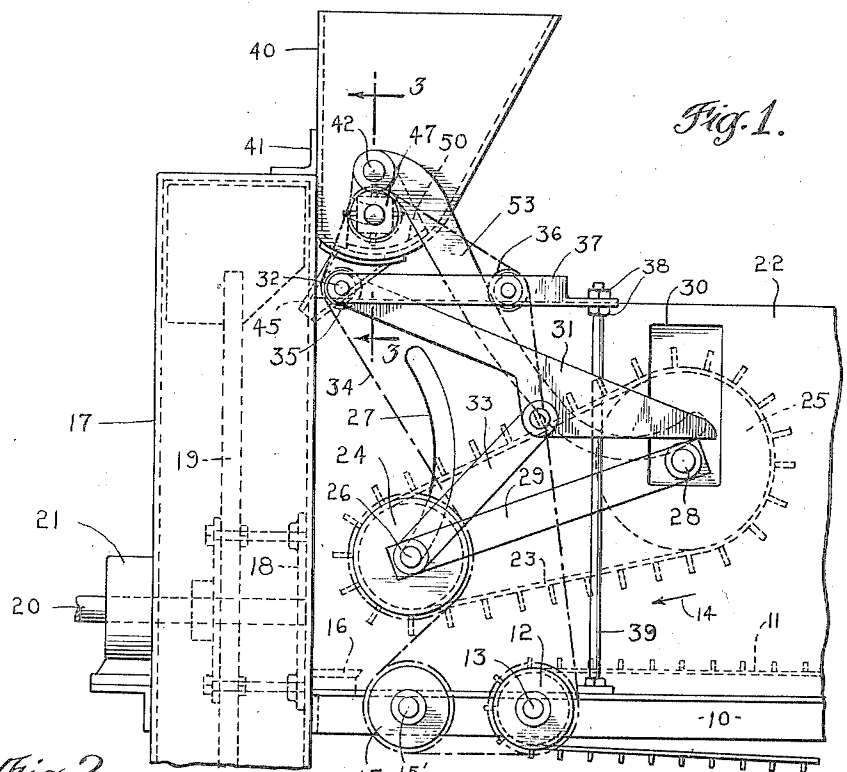
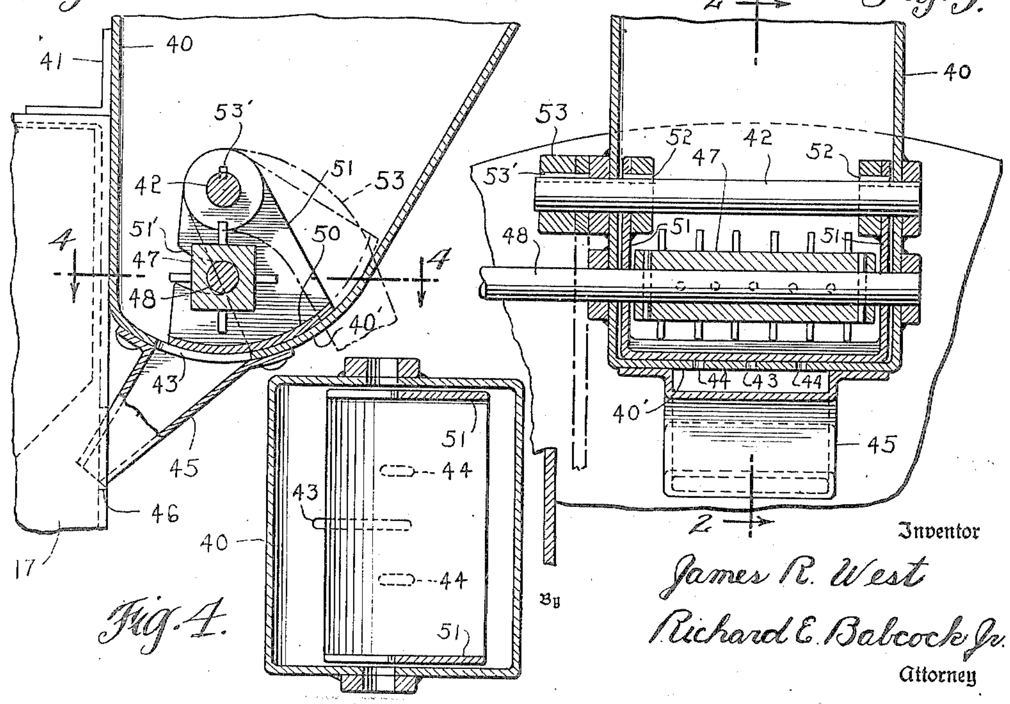
Inventor
James R. West
By
Richard E. Babcock Jr.
Attorney United States Patent Office 2,757,598

Patented Aug. 7, 1956

2,757,598

METERING DEVICE FOR GRANULAR MATERIAL

James R. West, New Holland, Pa., assignor, by mesne assignments, to Sperry Rand Corporation, New Holland, Pa., a corporation of Delaware Application December 15, 1954, Serial No. 475,326

6 Claims. (Cl. 99—235)

This invention relates to a metering mechanism for granular material and has particular reference to such a mechanism which is associated with a conveyer to meter granular material for admixture with the material being carried by the conveyer at a rate which is varied in accordance with variations in the thickness or depth of the conveyed material. Thus the granular material is metered into the conveyed material at a rate which is roughly proportional to the volume of conveyed material.

In accordance with the invention, the granular material is contained in a hopper having a discharge opening or outlet located to discharge granular material onto the conveyed material. The size of the outlet or discharge opening is rendered variable by means of a gate or baffle moveable to obstruct or constrict said opening to varying degrees, and the position of such gate is controlled responsive to varying vertical positions of a feeler element which rides over the upper surface of the conveyed material and floats upwardly or downwardly responsive to variations in the depth or thickness of such conveyed material. The feeler element is arranged to actuate the gate through an appropriate means or mechanism to increase the size of the discharge opening as the depth of the material increases and similarly to restrict such opening as the depth of the material decreases.

In the preferred form of the invention the said gate is mounted for swinging operative movement about a generally horizontal axis on the hopper and its position is controlled through mechanism in the form of a lever or arm projecting generally radially from the axis of swinging movement of the gate and operatively associated with the feeler element for vertical movement with the feeler element.

More specifically, the present invention is particularly adapted, though by no means limited, to use in connection with the infeed conveyer mechanism of a field forage harvester to meter a suitable granular preservative material, such as sodium metabisulphite, onto the crop material carried by the infeed conveyer, at a rate which is increased or decreased in accordance with increases or decreases in the depth of material at a selected point on the conveyer at a given time. Preferably the preservative is metered into the conveyed crop material after the latter enters the chopping and blowing unit of the forage harvester whereby the chopping action may be relied upon to thoroughly intermix the preservative with the chopped material.

The preferred embodiment of the invention incorporating the foregoing concepts and advantages is illustrated in the accompanying drawings in which:

Figure 1 represents a fragmentary slide elevational view of a conventional forage harvester structure having a metering device associated therewith in accordance with the invention, certain of the conventional elements of such structure being illustrated diagrammatically;

Figure 2, a section on the line 2—2 of Figure 3, on an enlarged scale relative to Figure 1;

Figure 3, an enlarged, detailed sectional view on the line 3—3 of Figure 1 illustrating the internal structure of the metering hopper of the invention; and, Figure 4, a section on the line 4—4 of Figure 2 showing a metering gate and its associated discharge openings in plan view.

Referring now in detail to the accompanying drawings, the reference character 10 generally designates the rigid supporting frame of a usual ensilage cutter or forage harvester structure which includes a lower feed apron 11 of the usual cross slatted type including laterally opposed chains which are supported around sprockets such as 12 fixed on a driven shaft 13 rotatably supported in frame 10. Crop material delivered onto the conveyer 11 by any suitable means is conveyed rearwardly thereby (in the direction of the arrow 14 in Figure 1) for movement over the top of feed roller 15 and across ledger knife 16 into the housing 17 of a usual ensilage cutter and blower unit. The roller 15 is rotatably supported across frame 10 by shaft 15' and a ledger knife 16 is fixedly supported across said frame in conventional manner for cooperation with the rotating knives 18 of a flywheel type cutter and blower generally designated 19 rotatably supported in the housing 17 on shaft 20. The shaft 20 is journaled through a bearing 21 and is rotated in usual manner from any suitable source of power to cause corresponding rotation and actuation of the cutter and blower unit 19 fixed thereon.

On opposite sides of the feed conveyer 11, the ensilage cutter of the illustrated embodiment is provided with relatively laterally opposed upstanding side walls, such as exemplified by the wall 22 in Figure 1, between which are vertically, floatingly mounted an upper feed conveyer or hold-down element comprising the endless conveyer element 23 supported around the rotors or sprockets 24 and 25, respectively, over the delivery end of the lower feed conveyer 11. The rearmost rotor or sprockets 24 are supported on a shaft 26 which is supported for generally vertical floating movement in arcuate slots, such as 27, in the opposite laterally opposed side walls 22 of the infeed unit.

The forwardly presented rotors or sprockets 25 are mounted on a shaft 28 supported between laterally opposed links such as 29 in Figure 1, which links 29 in turn are pivotally supported on and swingable about the shaft 26 to permit vertical movement of the rotors 25 and the forward end portion of the upper conveyer 23 about the axis of shaft 26.

One end of the shaft 28 projects through an opening 30 in side wall 22, the opening 30 being of sufficient size to provide clearance for the shaft 28 during its generally vertical arcuate floating movement.

Resting on the projecting end of the shaft 28 is a lever 31 which is pivotally supported at 32 on the side walls 22. Preferably this lever 31 has its medial portion connected by a link 33 with the shaft 26 of the rearmost rotors 24 so that large masses of conveyed material on the lower feed conveyer 11, riding beneath and raising the front end of the upper conveyer 23 and its associated shaft 28, will act through the lever 31 and link 33 to also raise the shaft 26 and thus the rear end of the conveyer 23 to a somewhat lesser extent in anticipation of this increased mass or thickness of material.

The several shafts 13, 15', and 26 are preferably all interconnected for simultaneous rotation at properly correlated speeds by means of a conventional chain drive 34.

It will be noted that this chain drive 34 also passes around an idler sprocket 35 rotatable on shaft 32 and a further idler sprocket 36 of a belt tightening lever or unit 37 pivoted on shaft 32 and adjustable by means of the nuts 38 threaded onto rod 39 extending between the outer end of this lever 37 and the frame 10.

The structure thus far described is old and well known in the art, being generally similar to the disclosure of the Miles L. Sensenig United States Patent 2,402,849 of June 25, 1946, and is not claimed as part of my invention, but is thus briefly described in order to promote an intelligent understanding of my invention.

A usual upwardly opening hopper 40 fixedly supported on the housing 17 by means of bracket 41 is provided with an arcuate bottom section 40', best shown in Figure 2, concentric to a transverse horizontal axis such as defined by the shaft 42 in the present embodiment. One or more discharge openings, preferably in the form of circumferentially disposed slots 43 and 44—44 are provided in the said arcuate bottom section 40'. Secured to and beneath the hopper 40 to receive the material discharged through slots 43 and 44 is a discharge spout 45, which, as will be seen by reference to Figure 2, has its lower discharge end directed into the interior of the chopper and blower housing 17 through an opening 46 (Figure 2) in the front wall thereof.

It will thus be seen that a granular preservative such as sodium metabisulphite contained within the hopper 40 may be delivered through the discharge openings 43 and/or 44, and the spout 45 into the housing 17 to be there thoroughly intermixed with the crop material delivered by the conveyer 11, incident to the cutting or chopping of such material.

In order to facilitate the uniform discharge of preservative or other granular material from hopper 41 for any predetermined setting of the discharge openings 43 or 44 there may be provided within the hopper a suitable rotary agitator 47, the shaft 48 of which is journaled in opposite laterally opposed ends of the hopper 40. This shaft 48 may conveniently be rotated by means of the same chain drive 34 which interconnects the several shafts 26, 15' and 13 as heretofore mentioned. Thus a rotary driving force transmitted to the shaft 13 through any suitable means (not shown) will produce rotation of all of the other said shafts.

The rate of discharge of the granular material through the bottom of the hopper 40 is controlled by means of a gate or closure element 50 which is movable to uncover varying portions of the respective discharge openings 43 and/or 44. Such a gate 50 preferably is of the swingable or rotary type and in the preferred embodiment is provided at its opposite ends with supporting arms 51 which are keyed on shaft 42, as at 52 in Figure 3, for control responsive to rocking of the shaft 42. It will be noted, of course, that the swingable or oscillatable gate 50 has its operative face of arcuate conformation conforming to and slideably seating against the inner face of the arcuate hopper bottom section 40'.

In the illustrated embodiment of the invention the upper feed element or hold-down device 23 is utilized as a feeler element and operatively associated with the gate 50 through means exemplified by the lever arm 53 (in Figures 1 and 2) to control the position of the gate 50 responsive to vertical positioning of the upper feed element 23.

To this end the lever or lever arm 53 is keyed on the shaft 42 as at 53' in Figures 2 and 3, and has its free end resting on one end of the shaft 28 which, as before mentioned, is freely vertically floatable with the forward end of the upper feed conveyer 23. The above mentioned supporting arms 51 for the gate 50 in the embodiment shown are arcuately slotted at 51' (as shown in Figure 2) to clear and avoid interference with the agitator shaft 48 throughout the range of operative movement of the gate 50.

In the operation of the foregoing mechanism, it will be seen that with the upper feed element 23 in its lowermost position (as shown in Figure 1) the lever 53 will be caused to swing the gate 50 toward closed position to the fullest extent permitted, although preferably the slots 51' in the gate end supports 51 are so proportioned that their ends will engage shaft 48 as in Figure 2 to uncover the rear end of discharge opening 43 and thus permit discharge of granular materials through said uncovered portion of the opening 43 at a minimum rate. This will, of course, occur when the thickness or depth of material being delivered on the conveyer 11 is insufficient to raise the floating upper conveyer or feeler element 23. However, when the depth of material on conveyer 11 becomes sufficient to raise the conveyer 23, this will act through the lever or means 53 to swing the valve or gate 50 in a counterclockwise direction, as viewed in Figure 2, to the end that it may uncover a larger area of the openings 43 and/or 44. Obviously, the degree of such movement of the gate 50 and the extent to which the said openings are uncovered will increase with the thickness of the material being delivered beneath the upper conveyer or feeler element 23, and thus, the amount of preservative granular material fed into the casing 17 from the hopper 40 will be generally proportioned to the volume of crop material conveyed thereinto by the feed conveyer 11.

In this application I have shown and described only the preferred embodiment of the invention simply by way of illustration of the preferred mode contemplated by me of carrying out the invention. However, I realize that the invention is capable of other and different embodiments and that its several details may be modified in various ways. Accordingly, the foregoing description and drawings are to be considered as merely illustrative in nature and not as exclusive.

Having thus described the invention, I claim:

1. An ensilage cutter comprising a housing and a cutter operatively disposed therein, an infeed conveyer operating to deliver crop material into said housing, a hopper, means supporting said hopper in fixed relation to said housing, said hopper having a discharge opening communicating with the interior of the housing, a gate supported by said hopper for movement across said discharge opening to vary the effective size of said opening, a feeler element and means supporting said feeler element for vertical floating movement in engagement with and responsive to variations in the depth of the material on said infeed conveyer, and positive means interconnecting said gate and said feeler element to vary the position of the gate in response to such movement of the feeler element.

2. An ensilage cutter comprising a housing and a cutter unit rotatable therein, an infeed conveyer operating to deliver crop material into said housing, a hopper, means supporting said hopper in fixed relation to said housing and over said infeed conveyor, said hopper having a discharge opening, a gate supported by said hopper for movement across said opening to vary the effective size of the opening, a feeler element, means supporting said feeler element for vertical floating movement in engagement with the material on said infeed conveyer, and positive means connecting said gate and said feeler element to vary the position of the gate responsive to floating movement of the feeler element.

3. The combination defined in claim 1 in which said hopper includes an arcuately curved bottom section, the discharge opening being formed in said bottom section, said gate being similarly arcuately curved and supported in the hopper for movement about an axis coincident with the center of curvature of said bottom section, said interconnecting means comprising a lever fixedly connected to said gate and extending radially from its said axis into operative association with said feeler element, whereby floating movement of the feeler element will cause swinging of said gate and thereby vary the effective size of said discharge opening.

4. An ensilage cutter comprising a housing and a cutter unit rotatable therein, an infeed conveyer operative to deliver crop material into said housing, a hopper, means of supporting said hopper in fixed relation to said housing, said hopper having an arcuately curved bottom provided with a material discharge opening therethrough communicating with the interior of said housing, a similarly arcuately curved gate swingably supported in said hopper for movement across said opening to vary the effective size of said opening, said gate being supported for swinging movement about an axis coincident with the center of curvature of the bottom section of said hopper, a lever fixedly associated with and extending generally radially from said gate, and a movable feeler element engaged by said lever, said feeler element being mounted in position to engage the material on said infeed conveyer and to be moved thereby to vary the position of said lever and gate responsive to variations in the depth of the material engaged by the feeler element.

5. In combination with an endless infeed conveyor, a mechanism for metering granular material into the material on said conveyer comprising a hopper, means supporting said hopper in fixed position above said conveyer, said hopper having a discharge opening, a gate supported by said hopper for movement across said opening to vary the effective size of the opening, a feeler element, means supporting said feeler element for vertical floating movement in engagement with and responsive to variations in the depth of the material on said conveyer, and means interconnecting said gate and said feeler element to vary the position of the gate in response to such movement of the feeler element.

6. The combination of claim 5 in which said hopper is provided with an arcuately curved bottom section, said discharge opening being disposed in said bottom section, said gate being swingable about an axis coincident with the axis of curvature of said bottom section, and said interconnecting means comprises a lever fixedly connected to said gate and extending in a generally radial direction therefrom into operative association with said feeler element.

References Cited in the file of this patent

UNITED STATES PATENTS

| | | |
|---|---|---|
| 2,298,482 | Holland-Letz | Oct. 13, 1942 |
| 2,507,820 | Shafer | May 16, 1950 |